Figures 1, 7:
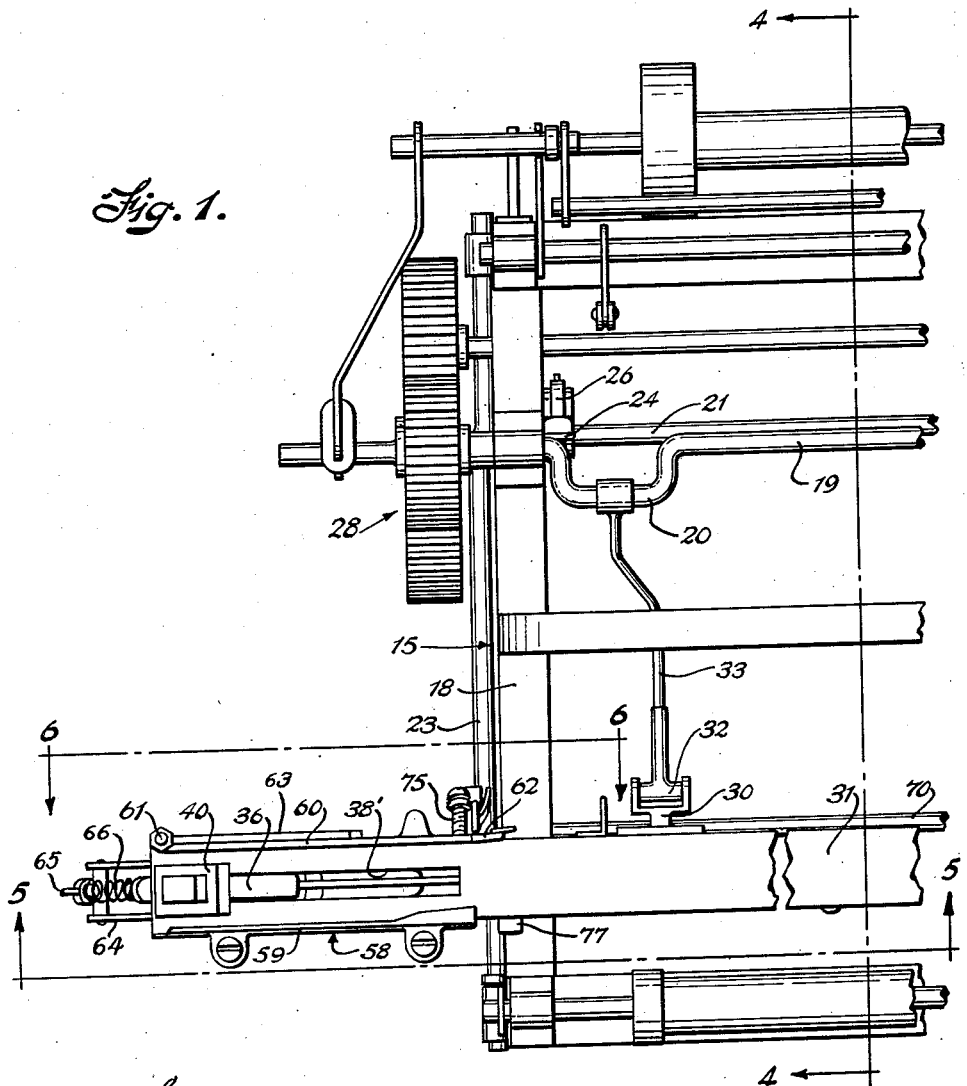

Oct. 5, 1948.                W. H. WEST                2,450,463
                        PICK MOTION FOR LOOMS
Filed Aug. 28, 1945                              6 Sheets-Sheet 1

Inventor
William H. West.

By Clarence A. O'Brien
and Harvey B. Jacobson
Attorneys

Oct. 5, 1948.  W. H. WEST  2,450,463
PICK MOTION FOR LOOMS
Filed Aug. 28, 1945  6 Sheets-Sheet 2

Inventor
William H. West.

By Clarence A. O'Brien
and Harvey B. Jacobson
Attorneys

Oct. 5, 1948. W. H. WEST 2,450,463
PICK MOTION FOR LOOMS
Filed Aug. 28, 1945 6 Sheets-Sheet 3

Inventor
William H. West.

By Clarence A. O'Brien
and Harvey B. Jacobson
Attorneys

Oct. 5, 1948. W. H. WEST 2,450,463
PICK MOTION FOR LOOMS
Filed Aug. 28, 1945 6 Sheets-Sheet 4

Inventor
William H. West.

By Clarence A. O'Brien
and Harvey B. Jacobson
Attorneys

Inventor
William H. West.

By Clarence A. O'Brien
and Harvey B. Jacobson
Attorneys

Oct. 5, 1948.  W. H. WEST  2,450,463
PICK MOTION FOR LOOMS
Filed Aug. 28, 1945  6 Sheets-Sheet 6

Inventor
William H. West

By Clarence A. O'Brien
and Harvey B. Jacobson
Attorneys

Patented Oct. 5, 1948

2,450,463

UNITED STATES PATENT OFFICE 2,450,463

PICK MOTION FOR LOOMS

William H. West, Montgomery, Ala., assignor to The Alabama Textile Engineering Company, Inc., Montgomery, Ala., a corporation of Alabama Application August 28, 1945, Serial No. 613,143

9 Claims. (Cl. 139—145)

This invention relates to pick motion for looms, and has for its object to increase production and the efficiency of loom operation.

Another object is to improve the smoothness of operation of the picker sticks and to eliminate the vibration accompanying the operation of picker sticks by the conventional mechanism.

Another object is to utilize the kinetic energy of a shuttle in flight and to employ such energy to operate a latch which cooperates with mechanism to hold the shuttle against a picker stick ready for the next throw.

Still other objects include the application of uniform pressure to the driving gears so as to avoid uneven wear such as is commonly experienced with the conventional type of pick motion.

A still further object of the invention is to enable looms of the fly shuttle type to be readily equipped with this improved pick motion.

The above and other objects may be attained by employing this invention which embodies among its features a spring-driven picker stick, means operated in unison with the main drive shaft of the loom for storing energy in the spring, latch means to hold the picker stick against movement under the influence of the spring, and means operating in unison with the lay periodically to release the latch means to allow the picker stick to be driven under the influence of the spring to throw the shuttle across the loom.

Other features include collecting and storing the energy of the shuttle as it nears the end of its run in the picker stick spring for subsequent release in throwing the shuttle on its return run.

Still other features include a loom box at each end of the lay, one wall of which is moved out of contact with the shuttle at predetermined periods to free the shuttle for movement under the influence of the picker stick.

Still other features embody employing a 360° motion of the cam shaft for storing energy in the picker stick driving spring so as to eliminate vibration of and wear on the various parts of the loom.

Figure 2:
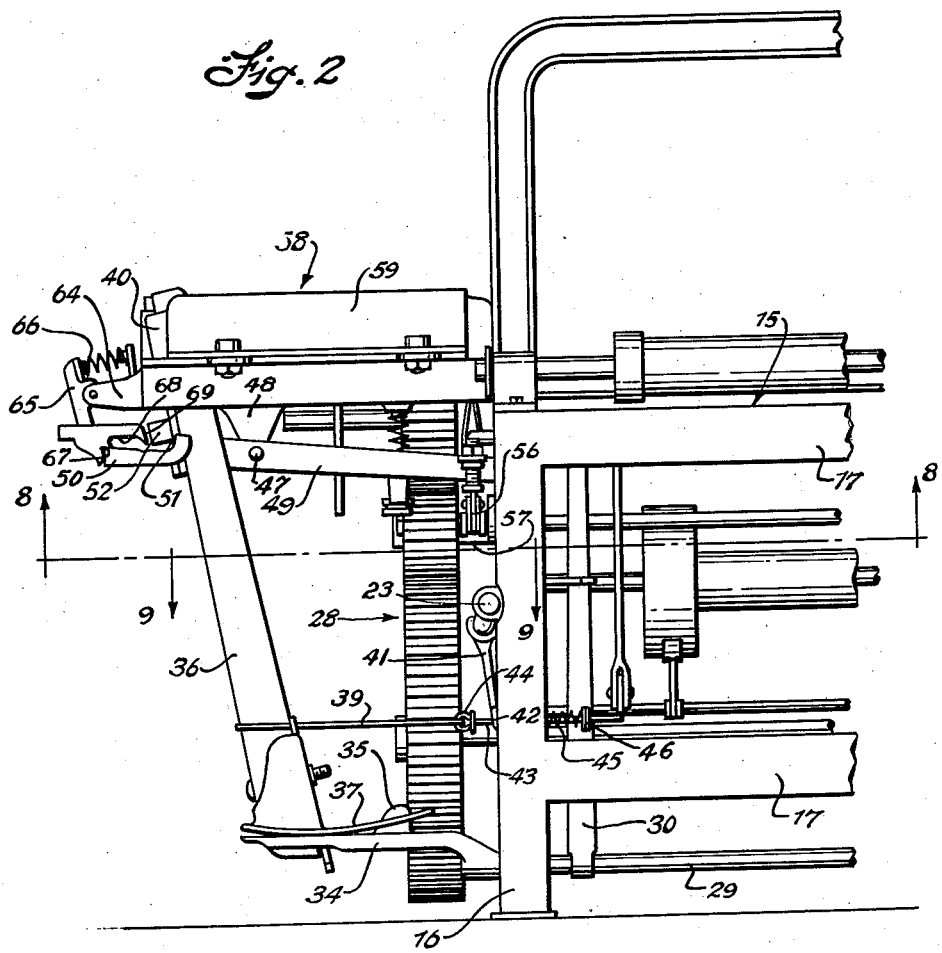
Figure 3:
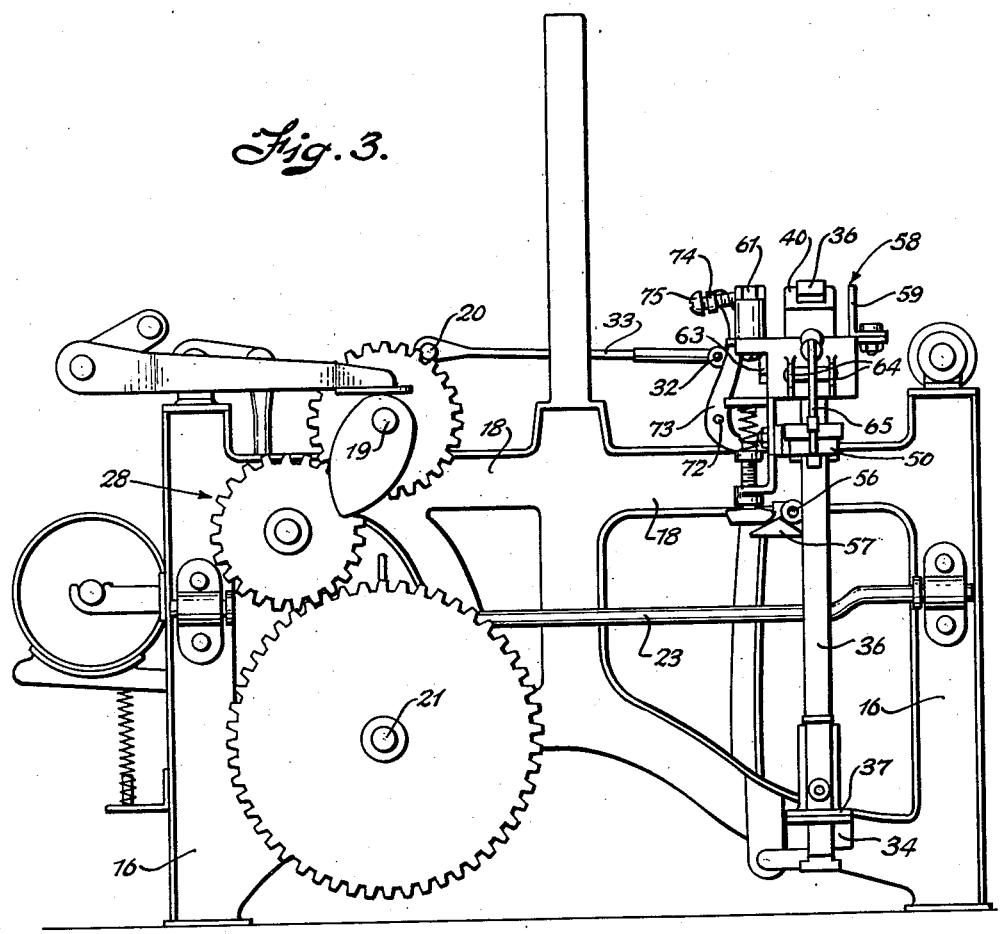
Figure 12:
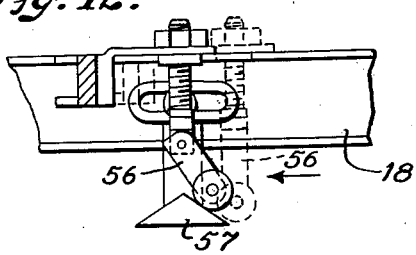
Figure 4:
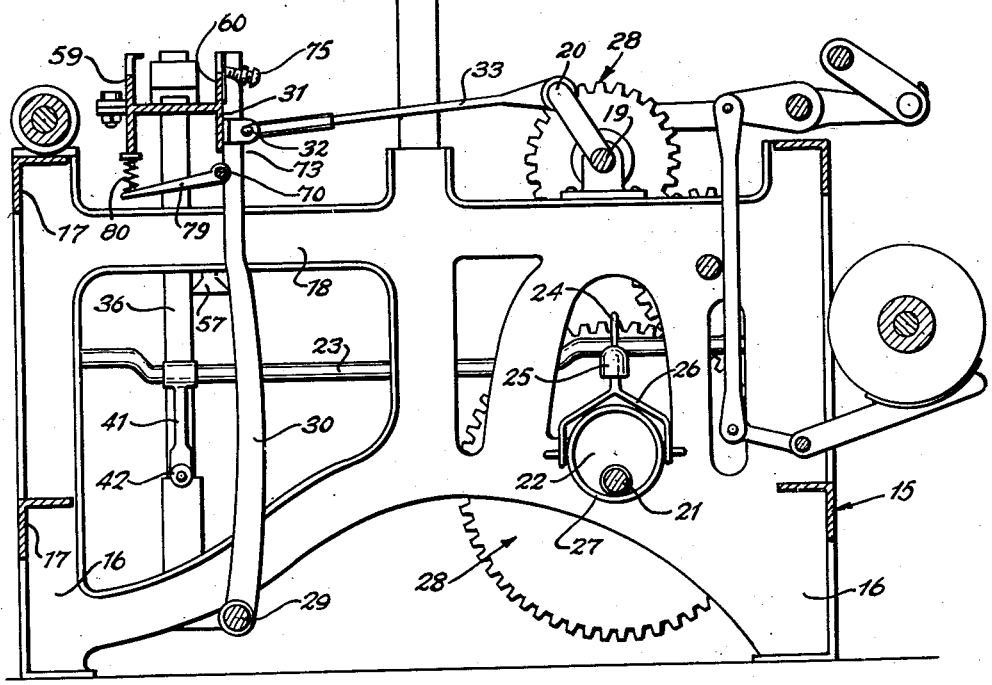
Figure 11:
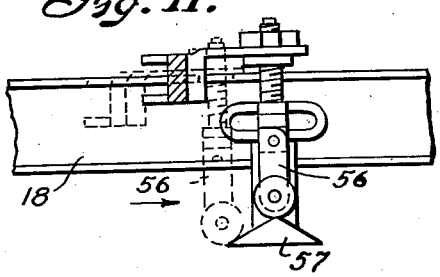
Figure 5:
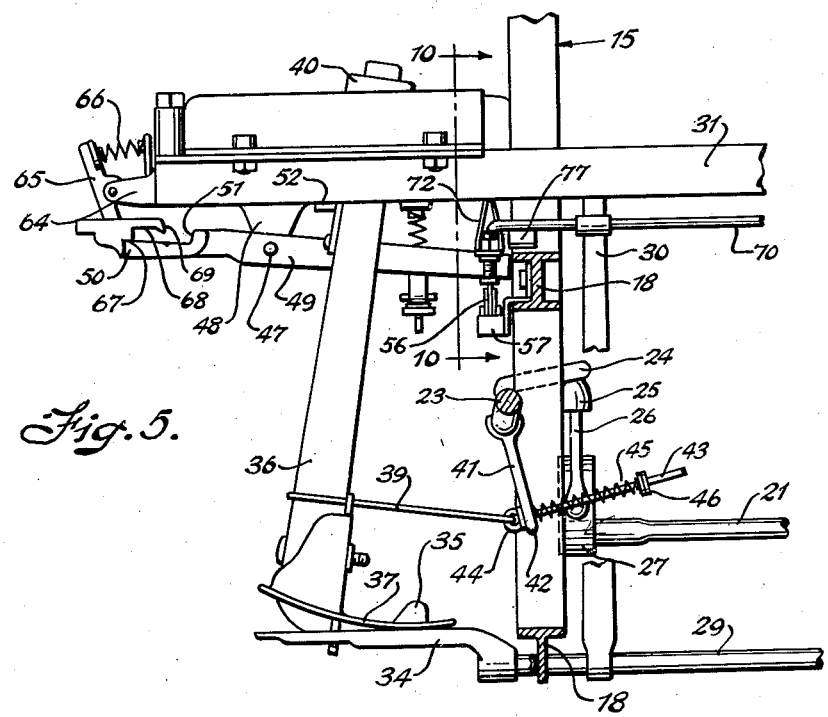
Figure 6:
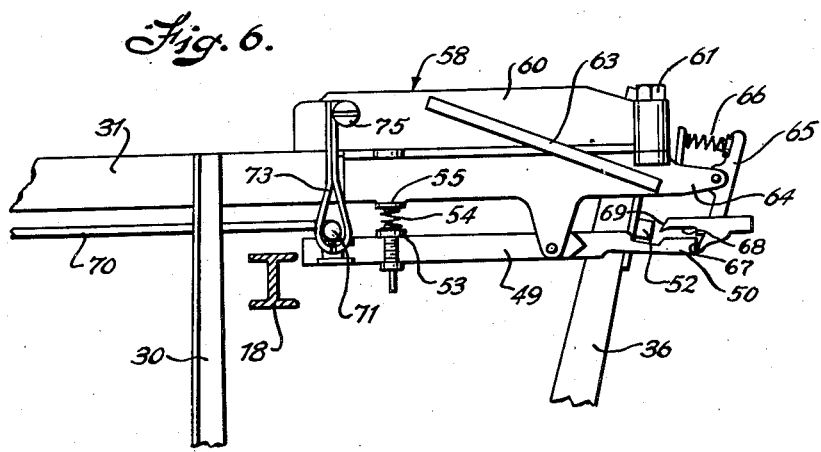
Figure 8:
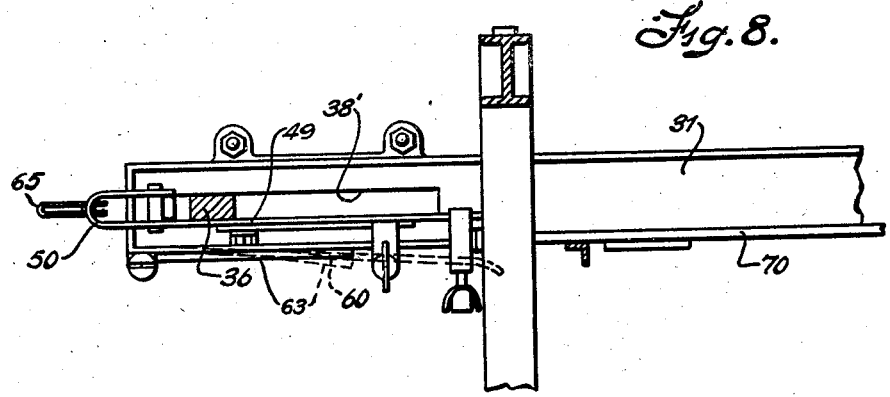
Figure 9:
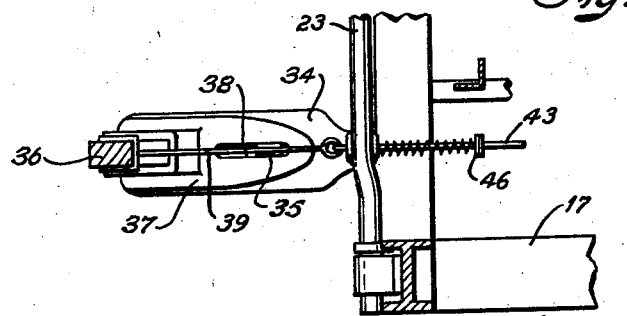
Figure 10:
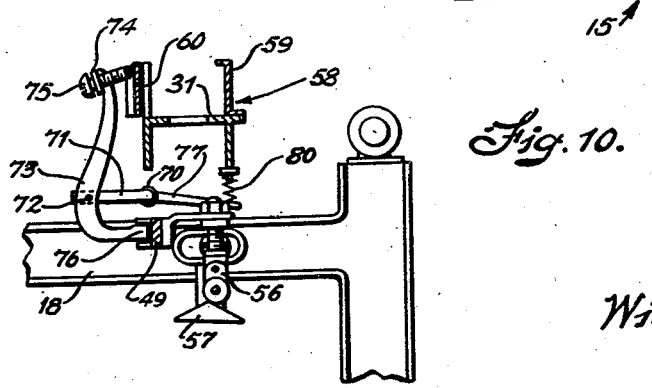

In the drawings:

Figure 1 is a fragmentary top plan view of one end of a loom equipped with this improved pick motion, Figure 2 is a front view in elevation of Figure 1, Figure 3 is a side view of Figure 1, Figure 4 is a sectional view taken on the line 4—4 of Figure 1, Figure 5 is a sectional view taken on the line 5—5 of Figure 1, Figure 6 is a sectional view taken on the line 6—6 of Figure 1, Figure 7 is a fragmentary side view of the trigger trip cam, Figure 8 is a horizontal sectional view taken on the line 8—8 of Figure 2, and looking in the direction of the arrows, Figure 9 is a horizontal sectional view taken on the line 8—8 of Figure 2, and looking in the direction of the arrows 9—9, Figure 10 is a fragmentary sectional view taken substantially on the line 10—10 of Figure 5, Figure 11 is a fragmentary side view of the loom frame showing the trigger member in one position relative to the trip cam, and Figure 12 is a view similar to Figure 11 showing the trigger member in another position relative to the trip cam.

In the drawings, a loom frame designated generally 15 comprises the customary standards 16 connected by horizontal bars 17 and the horizontal end frame members 18. Mounted for rotation about a horizontal axis extending transversely of the frame 15 is a main drive shaft 19 which is provided at suitably spaced points with a crank arm 20 for a purpose to be more fully hereinafter described. Mounted beneath the main drive shaft 19 is a cam shaft 21 to which is attached adjacent opposite sides of the frame 15 eccentric discs 22. Mounted to oscillate about a horizontal axis at each side of the loom frame 15 and perpendicular to the cam shaft 21 is a rock shaft 23 carrying at one end a horizontally extending arm 24 to the end of which is attached a ball and socket connection 25 carrying a yoke 26 between the arms of which is pivoted an eccentric strap 27 which encircles its respective eccentric 22. The main drive shaft 19 and the cam shaft 21 are arranged to operate in unison with the cam shaft making one revolution to two of the drive shaft through the medium of a gear train 28. It will thus be seen that as the main drive shaft 19 rotates, the rock shafts 23 will be oscillated about their respective axes.

Mounted for oscillatory motion adjacent each end of a transversely extending horizontally disposed shaft 29 is an arm 30. A lay 31 which comprises an inverted channel extending transversely of the loom frame 15 is supported at the upper ends of the arms 30 and pivoted near each end of the lay 31, as at 32, is a connecting rod 33, the opposite end of each of which embraces a crank 20 so that as the main drive shaft 19 is rotated, the lay will be oscillated about the axis of the shaft 29.

Secured to each end of the shaft 29 is a bracket 34, each of which is provided intermediate its ends with an upstanding lug 35. Each bracket 34 provides a support for the lower end of a picker stick 36 which is provided with a foot 37 having a longitudinal slot 38 for the reception of the lug 35, as illustrated in Figures 2 and 5. The foot 37 is curved, as illustrated, to allow the picker stick 36 to rock through a vertical arc parallel with the axis of the shaft 29, and the upper end of the picker stick projects up through a slot 38' formed in the lay 31 to engage the loom shuttle when the latter moves into end position on the lay. Secured to the picker stick 36 near the end to which the foot 37 is attached is a link 39 for a purpose to be more fully hereinafter described, and carried at the upper end of the picker stick is a picker 40 against which the loom shuttle impinges as it nears the end of its flight.

Attached to each rock shaft 23 is a depending arm 41 formed at its lower end with an eye 42 through which a rod 43 projects. The end of the rod on the outer side of the eye 42 is provided with an eye 44 to which the end of the link 39 opposite that connected to the picker stick 36 is attached. A compression coil spring 45 surrounds the rod 43 and adjustably secured to the end of the rod 43 opposite that carrying the eye 44 is a suitable stop 46 against which one end of the spring 45 abuts, it being understood that the opposite end of the spring 45 abuts the arm 41. It will thus be seen that as the arm 41 moves through the medium of shaft 23, which in turn is driven by means of the eccentric strap 27, eccentric 22 and shaft 21, the picker stick 36 will be moved outwardly toward the outer end of the slot 38' into the position shown in Figure 2, at which point it is latched as will be hereinafter explained. Continued movement of the cam shaft will cause the arm 41 to move away from the picker stick and compress the spring 45 against the stop 46.

Pivotally mounted, as at 47, to a bracket 48 one of which depends from the lay 31 near each extreme outer end, is a latch member 49 having a U-bend 50 adjacent its outer end. This latch member 49 carries a pair of spaced latch fingers 51 for engagement with a keeper 52 carried by the picker stick 36 just below the lay 31. The latch member 49 carries on its rear side an outwardly extending ear 53 which forms an abutment for the lower end of a compression coil spring 54, the upper end of which abuts an outstanding ear 55 carried by the lay 31, and it will thus be seen that the latch fingers 51 are normally urged upwardly into position to contact the keeper 52 when the picker stick 36 is in the position illustrated in Figure 2. The end of the latch member 49 opposite that carrying the U-bend 50 is provided with a depending trigger member 56 which is adapted to ride over a trip cam 57 carried by the horizontal cross bar 18 of the frame 15. It will thus be seen that as its lay 31 and picker stick 36 move in unison about the axis of the shaft 29 under the influence of the cranks 20, the trigger member 56 at each end of the lay will be caused to periodically contact the trip member 57 so as to oscillate the latch 49 about its pivot 47 to release the latch finger 51 from engagement with the keeper 52 and allow a picker stick 36 to be moved under the influence of its respective spring 45.

Mounted adjacent each end of the lay 31 and extending for a distance substantially equal to the length of the slot 38 is a shuttle box designated generally 58, the front wall 59 of each of which is rigidly fixed to the front edge of the lay, while the rear wall 60 of each box is pivoted adjacent the extreme end of the lay, as at 61. The inner end of each wall 60, i. e., the end opposite that pivoted at 61, is provided with a curved lip 62 to provide a slightly funnel-shaped guide for the shuttle as it enters the box and approaches the end of its flight across the lay 31. Attached to the lay near each extreme outer end on the rear side thereof is a leaf spring 63, the opposite end of each of which is attached to an adjacent wall 60 so as yieldingly to hold the wall 60 away from the lay and thus maintain the box 58 in open shuttle-receiving position. Extending longitudinally from each end of the lay 31 is a pair of spaced ears 64 between each of which a spring-pressed latch lever 65 is pivoted. Each latch lever is urged by a spring 66 toward an adjacent latch member 49 and into engagement with the bight of the U-shaped portion 50 thereof. As illustrated, the lower end of each latch lever 65 which engages the U-shaped portion 50 of the adjacent lever 49 is provided with stepped shoulders 67 and 68, and the shoulder 68 is extended in the direction of the adjacent picker stick 36 to form a cam face 69 which is adapted to be engaged by the outer face of the keeper 52 when the picker stick is moved outward into full retracted position in the slot 38'. Engagement of the keeper 52 with the cam surface 69 causes the lever 65 to move a distance sufficient to allow the U-shaped portion 50 of the lever 49 to move off of the shoulder 67 and onto the shoulder 68, thus allowing the lever 49 to move about its pivot 47 under the influence of the spring 54, a distance sufficient to cause the latch members 51 to engage the keeper 52 on the picker stick 36, and latch the picker stick in its fully retracted position. Due to the fact that the lever 49 is pivoted at 47, i. e., near the U-shaped portion 50, it is obvious that a slight movement of the U-shaped portion will be translated into a movement of considerable magnitude at the opposite end of the lever.

Mounted for oscillating movement on the under side of the lay 31 is a shaft 70 which is provided at opposite ends with parallel arms 71 to the ends of which are pivoted, as at 72, yokes 73. These yokes are substantially L-shaped and the longer leg of each extends upwardly on the rear side and near the free end of the back wall 60 of an adjacent box 58. Carried at the upper end of the longer leg of each L-shaped yoke is an ear 74 in which an adjusting screw 75 is threaded in such a position that its point contacts the rear face of the rear wall 60 of the adjacent box 58. The opposite leg of each L-shaped yoke 73 extends forwardly beneath the lay adjacent the inner end of the slot 38' and is provided with a ball head 76 which is received between a pair of spaced ears carried by the lever 49 directly behind the trigger 56. Carried by the shaft 70 intermediate its ends and extending forwardly toward the front edge of the lay 31 is an arm 79 (Fig. 4) which is urged downwardly under the influence of a spring 80 so as to yieldingly urge the ends 71 of the bars upwardly. Upward movement of the ends 71 of the shaft will cause the adjusting screws 75 to move inwardly so that each will impinge against the rear wall 60 of its respective box 58.

In operation, as the main drive shaft is rotated, the cam shaft 21 will be driven by the gear train 28 so as to make one revolution to each two for the drive shaft and cause the eccentrics 22 to rock the arms 24, which in turn oscillate the rock shafts 23. Such movement causes the levers 41 to swing to and fro in an arc about the axes of their respective shafts 23. Through the medium of the links 39, the picker sticks 36 move to and fro in the slots 38' in the lay 31. Outward movement of each picker stick will move its keeper 52 into position to be engaged by the latch fingers 51 of an adjacent latch lever 49 and as the shuttle traveling across the lay 31 enters a box 58 at that end of the lay in which a picker stick is retracted, it contacts the picker 40 of the picker stick and the impact causes the keeper 52 to contact the end 69 of the latch 65 to disengage the bight portion of the U-shaped end of the bar 49 from the shoulder 67. This causes the latch fingers 51 to move into latching engagement with the keeper 52 to hold the picker stick retracted. Simultaneously the opposite end of the lever 49 moves downwardly, thus causing the L-shaped arm 73 to rock about its pivot 72 and cause the screw 75 to impinge against the back wall 60 of the box 58. The pressure of the screw on the wall 60 will move it inwardly, against the urge of the spring 63 to grip the shuttle. Such gripping action is aided by the spring 80 through its tendency to rotate the shaft 70 and hence yieldingly move the arms 71 upwardly. Having safely latched the picker stick 36 at one end of the lay and clamped the shuttle in an adjacent box 58, continued movement of the cam shaft 21 will cause the rock arms 41 to reverse their direction of motion so as to compress the spring 45 of the latched picker stick between the inner side of the rock arm and the stop 46 carried by the rod 43. The picker sticks 36 being mounted on the brackets 34 oscillate with the shaft 29 and the lay 31 so as to cause the triggers 56 to move to and fro across the trip cams 57. The triggers are so constructed that as the lay and the picker sticks move toward the take up end of the loom, the triggers move harmlessly over the trip cams, but when the direction of motion of the lay and picker sticks is reversed, the triggers engage the trip cams 57 in such a manner as to cause the inner ends of the arms 49 to be elevated, thereby moving the latch fingers 51 out of engagement with the keepers 52. Such disengagement of the latch fingers from the keeper of the picker stick, the spring of which has been compressed, will allow the picker stick to rock on its foot 37 under the influence of the spring 45 and thereby throw the shuttle across the surface of the lay. Simultaneously with the upward movement of the inner end of the arm 49 the lower horizontally extending leg of the yoke 73 is elevated so as to rock the yoke about its pivot 72 and thereby disengage the screw 75 from contact with the back wall 60 of the box 58. Such release of pressure against the back wall 60 permits it to be swung under the influence of the spring 63 about the pivot 61 out of contact with the side of the shuttle so that the full power of the spring 45 driving the picker stick 36 may be exerted upon the shuttle to send it to the opposite end of the lay 31. It is, of course, to be understood that the opposite end of the lay is provided with a similar box and picker stick operating mechanism to throw the shuttle back to its starting position and that the shuttle moves alternately from one side to the other with each back stroke of the lay during the weaving operation.

It will be understood that the pickers 36 must move alternately under the influence of their respective springs 45 in proper timed relation with the lay 31 and hence the eccentrics will be 180 degrees out of phase with one another.

While in the foregoing there has been shown and described the preferred embodiment of this invention, it is to be understood that minor changes in the details of construction, combination and arrangement of parts may be resorted to without departing from the spirit and scope of the invention as claimed.

I claim:

1. A pick motion for a loom having an oscillating lay and a picker movable longitudinally of the lay, comprising a rock arm movable in timed relation to the oscillations of the lay, a rod slidable through the rock arm, a stop on the rod on each side of the rock arm, a compression spring between the rock arm and one of the stops, a link coupled to the rod adjacent the opposite stop and to the picker for moving the picker to retracted position as the rock arm moves in one direction, a latch arm carried by the lay to hold the picker in retracted position during the motion of the rock arm in a reverse direction and the consequent compression of the spring, and means actuated by the oscillation of the lay to release the latch arm and permit the picker to move under the influence of the energy stored in the spring.

2. A pick motion for a loom having an oscillating lay and a picker movable longitudinally of the lay, comprising a rock arm movable in timed relation to the oscillations of the lay, a rod slidable through the rock arm, a stop on the rod on each side of the rock arm, a compression spring between the rock arm and one of the stops, a link coupled to the rod adjacent the opposite stop and to the picker for moving the picker to retracted position as the rock arm moves in one direction, means carried by the lay and actuated by the impact of a shuttle moving across the lay and against the picker to hold the picker in retracted position during the movement of the rock arm in a reverse direction and the consequent compression of the spring, and means actuated by the oscillation of the lay to release the picker holding means and permit the picker to move under the influence of the energy stored in the spring.

3. A pick motion for a loom having an oscillating lay and a picker movable longitudinally of the lay, comprising a rock arm movable in timed relation to the oscillations of the lay, a rod slidable through the rock arm, a stop on the rod on each side of the rock arm, a compression spring between the rock arm and one of the stops, a link coupled to the rod adjacent the opposite stop and to the picker for moving the picker to retracted position as the rock arm moves in one direction, an expansible shuttle box on the lay adjacent the picker, means yieldingly to hold the shuttle box expanded, means actuated by the impact of the shuttle against the picker to contract the shuttle box and hold the picker in retracted position during the movement of the rockarm in a reverse direction and the consequent compression of the spring and means actuated by the oscillation of the lay simultaneously to release the contracting force on the shuttle box and to release the picker whereby the picker will move under the influence of the energy stored in the spring.

4. A pick motion for a loom having an oscillating lay and a picker movable longitudinally of the lay, comprising a rock arm movable in timed relation to the oscillations of the lay, a rod slidable through the rock arm, a stop on the rod on each side of the rock arm, a compression spring between the rock arm and one of the stops, a link coupled to the rod adjacent the opposite stop and to the picker for moving the picker to retracted position as the rock arm moves in one direction, a latch arm carried by the lay, means to urge the latch arm into engagement with the picker to hold it in retracted position during the movement of the rock arm in a direction to compress the spring and restraining means on the lay to hold the latch arm out of latching engagement with the picker until the picker is moved by the impact of a shuttle moving across the lay.

5. A pick motion for a loom having an oscillating lay and a picker movable longitudinally of the lay, comprising a rock arm movable in timed relation to the oscillations of the lay, a rod slidable through the rock arm, a stop on the rod on each side of the rock arm, a compression spring between the rock arm and one of the stops, a link coupled to the rod adjacent the opposite stop and to the picker for moving the picker to retracted position as the rock arm moves in one direction, a latch arm carried by the lay, means to urge the latch arm into engagement with the picker to hold it in retracted position during the movement of the rock arm in a direction to compress the spring and restraining means on the lay to hold the latch arm out of latching engagement with the picker until the picker is moved by the impact of a shuttle moving across the lay, and means movable in unison with the lay to move the latch arm and release the picker for movement under the influence of the energy stored in the spring.

6. A pick motion for a loom having an oscillating lay and a picker movable longitudinally of the lay, comprising a rock arm movable in timed relation to the oscillations of the lay, a rod slidable through the rock arm, a stop on the rod on each side of the rock arm, a compression spring between the rock arm and one of the stops, a link coupled to the rod adjacent the opposite stop and to the picker for moving the picker to retracted position as the rock arm moves in one direction, a latch arm carried by the lay to hold the picker in retracted position during the motion of the rock arm in a reverse direction and the consequent compression of the spring, means to restrain engagement of the latch arm with the picker until the picker is moved under the impact of a shuttle moving across the lay.

7. A pick motion for a loom having an oscillating lay and a picker movable longitudinally of the lay, comprising a rock arm movable in timed relation to the oscillations of the lay, a rod slidable through the rock arm, a stop on the rod on each side of the rock arm, a compression spring between the rock arm and one of the stops, a link coupled to the rod adjacent the opposite stop and to the picker for moving the picker to retracted position as the rock arm moves in one direction, a latch arm carried by the lay to hold the picker in retracted position during the motion of the rock arm in a reverse direction and the consequent compression of the spring, means to restrain engagement of the latch arm with the picker until the picker is moved under the impact of a shuttle moving across the lay, and means actuated by the oscillation of the lay to move the latch arm into picker releasing position and permit the picker to be moved under the influence of the energy stored in the spring.

8. A pick motion for a loom which includes an oscillating lay, an expansible shuttle box adjacent an end of the lay, a picker movable longitudinally through the shuttle box, means on the shuttle box yieldingly to hold the shuttle box expanded, means actuated by the impact of a shuttle against the picker to contract the shuttle box and bind the shuttle therein and means carried by the lay and actuated by the impact of the shuttle against the picker to latch the picker in retracted position.

9. A pick motion for a loom which includes an oscillating lay, a normally expanded shuttle box adjacent one end of the lay, a picker movable longitudinally through the shuttle box, means actuated by the impact of a shuttle against the picker to contact the shuttle box and bind the shuttle therein, and means carried by the lay and actuated by the impact of the shuttle against the picker to latch the picker in retracted position.

WILLIAM H. WEST.

REFERENCES CITED

The following references are of record in the file of this patent:

UNITED STATES PATENTS

| Number | Name | Date |
| --- | --- | --- |
| 783,051 | Lafrance | Feb. 21, 1905 |
| 847,952 | Lamwers | Mar. 19, 1907 |
| 1,281,070 | Robertson | Oct. 8, 1918 |
| 1,564,386 | Wells | Dec. 8, 1925 |
| 1,704,860 | Lassey | Mar. 12, 1929 |
| 2,160,338 | Moessinger | May 30, 1939 |
| 2,172,615 | Kennedy | Sept. 12, 1939 |

FOREIGN PATENTS

| Number | Country | Date |
| --- | --- | --- |
| 534 | Great Britain | Nov. 14, 1896 |
| 218,733 | Great Britain | July 10, 1924 |
| 366,768 | Great Britain | Feb. 11, 1932 |